Feb. 15, 1927.　　　　　　　　　　　　　　　　　　　　1,617,510
M. W. ARROWOOD
METHOD AND MEANS FOR TREATING METALS
Filed Aug. 8, 1921
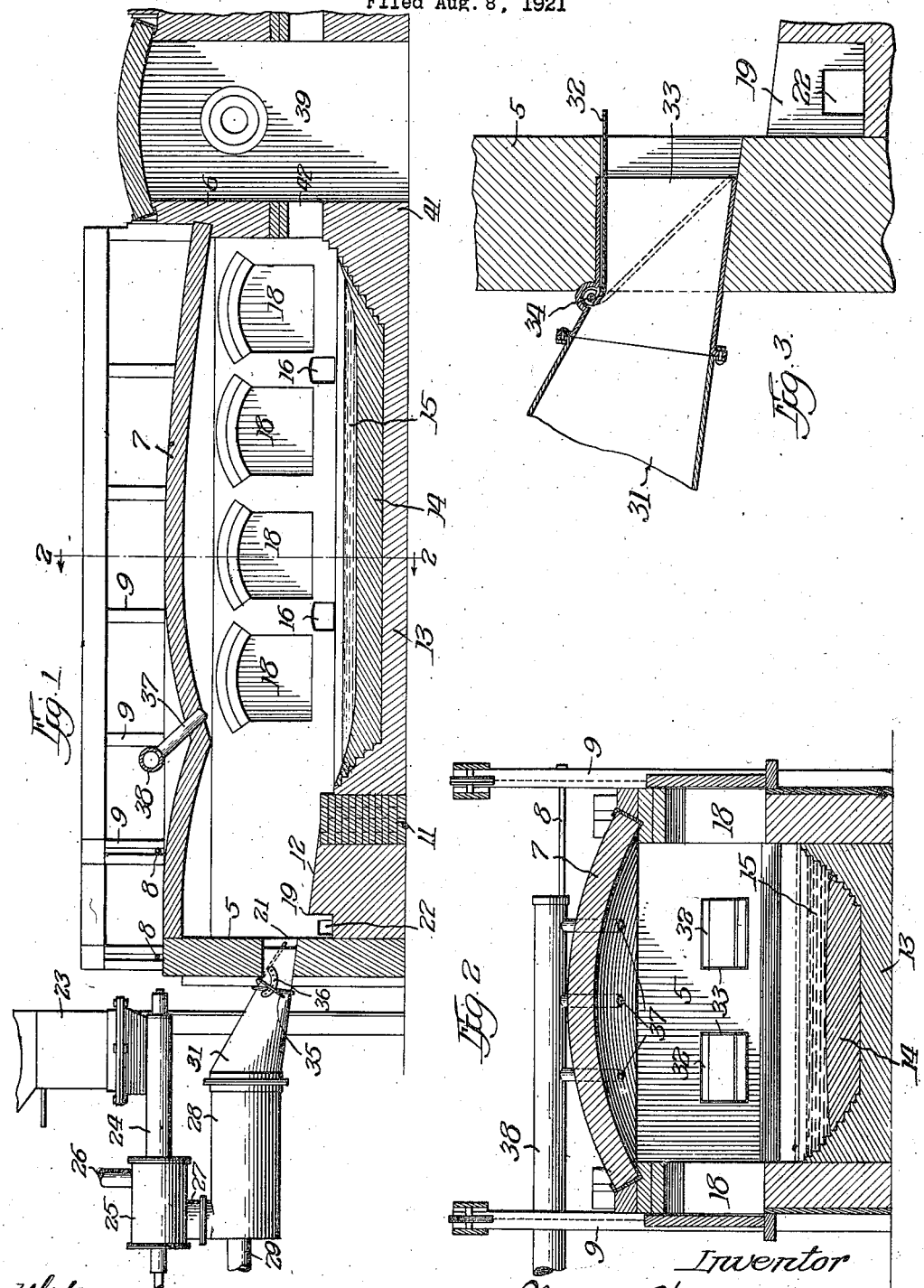
Inventor
Milton W. Arrowood
By Ira J. Wilson
Atty.
Witness:

Patented Feb. 15, 1927.                                              1,617,510

UNITED STATES PATENT OFFICE.

MILTON W. ARROWOOD, OF CHICAGO, ILLINOIS, ASSIGNOR TO GROUND COAL ENGINEERING CORPORATION, OF WORCESTER, MASSACHUSETTS.

METHOD AND MEANS FOR TREATING METALS.

Application filed August 8, 1921. Serial No. 490,529.  REISSUED

This invention relates in general to a method and means for treating metals in furnaces, and while I have shown it in the present drawings as embodied in a melting furnace, it should be understood that the principles thereof are capable of embodiment in furnaces used for other purposes, such as annealing or heating furnaces for instance.

In furnaces of this general character, and particularly in melting furnaces, it has been customary heretofore to provide a hearth which is sloped to a depressed point where the tap hole is located. As the result of this shape of hearth, the solid charge of pig iron and scrap iron which is piled upon the bottom of the hearth for melting purposes, is concentrated over the depressed portion of the hearth where it assumes considerable depth, forming a barrier for the flame of burning fuel. It follows therefore that the flame cannot penetrate to any considerable distance into the base of the charge and becomes concentrated to a large degree upon and against the forward portion of the charge, while the remaining portions are subjected to very little heat. The result is that the melting of the charge takes place very slowly and requires the expenditure of a great amount of fuel. Furthermore, the molten metal forms a deep pool in the depressed portion, the bottom of which tends to become cooled so that in practice, it becomes necessary to run the furnace for a considerable period after the metal is all melted before it is all heated sufficiently for pouring purposes.

One of the primary purposes of my present invention is to provide a furnace, the hearth of which will be substantially level from end to end and devoid of depressions so as to provide a relatively shallow bath of substantially uniform depth. This construction permits of a more even distribution of the solid charge over the area of the hearth, with the result that a large area of the charge is exposed to the action of the flames, thus materially facilitating and expediting the melting of the charge and reducing the amount of fuel required for the melting. Manifestly, the molten metal in a shallow bath having a large top surface exposed to the heat in the furnace can be thoroughly heated much more expeditiously than the same quantity of metal in a deep pool. Consequently, with my improved shallow bath furnace, the pouring may be begun soon after the actual melting has been completed, thereby effecting a material economy both in time and in fuel.

To insure the flow of the molten metal from the hearth through the tap holes, the hearth is preferably slightly inclined transversely either from one side to the other, or preferably as herein shown, is slightly arched transversely so that the molten metal will flow to both sides thereof, where it may be withdrawn through tap holes at each side of the furnace.

In furnaces of this character it has heretofore been customary to maintain a strong draft from the melting chamber through the outlet stack by which a vast part of the heat units generated by fuel supplied to the furnace are carried away and dissipated.

My invention contemplates the delivery of the fuel in a comminuted or pulverized form mixed with air, to the furnace in controlled proportions at low velocity and under low pressure, and the communicating opening between the furnace and the stack is so located and so proportioned with respect to the fuel pressure and the size of the stack is so proportioned that the furnace chamber is usually maintained under a slight static pressure and the products of combustion leave the chamber and are delivered from the stack at a low velocity. Instead therefore of drawing enormous quantities of heat up the stack, the fuel is practically completely consumed in the furnace chamber so that its heat units become effective upon the charge to be heated or melted and a minimum of heat is lost through the stack, thereby greatly increasing the efficiency of the furnace. The stack and the draft opening between the furnace and the stack are so designed as to favor a slight static pressure in the furnace, but by varying the fuel delivery pressure, this static pressure may be changed to a substantially balanced draft or to an appreciable outlet draft if desired. My invention therefore provides for a wide range of flexibility in its operation to successfully meet various conditions to which it may be subjected.

Another feature of my invention resides in the provision of means for delivering the comminuted fuel mixed with air to the furnace in a turbulent condition, so that it swirls as a mass of slow moving mixture over the surface of the charge so as to more readily distribute its heat thereto. The effectiveness of the burning mixture is further increased by delivering it downwardly or in a downwardly inclined direction from the nozzle against the bath which results in a penetration of the flame into the mass of loosely piled material forming the charge on the hearth, thereby causing the flame to continue along the hearth at the base of the charge while the charge is in solid state, and also causing it to impinge against the adjacent margin of the bath when melted, thus producing a most effective heating action.

A further object of my invention is to provide a furnace in which the front bridge wall is spaced a limited distance from the front wall of the furnace chamber, the forward end of the hearth between these walls being provided with a masonry floor inclined downwardly from the front wall to the bridge wall so that any slag deposited on this portion of the hearth will drain freely into the bath. In order however to relieve the bath from an accumulation of as much slag as possible, this floor is provided adjacent the front wall and immediately beneath the point of delivery of the fuel into the furnace, with a depressed pocket. Since the fuel is delivered at low velocity, the flame formation occurs near the front wall and that slag which results from the initial flame formation drops immediately into this pocket from which it may be removed at intervals through cleaning doors communicating with the pocket. This construction eliminates to a large extent that portion of the slag which is particularly injurious to the brick work of the bath and thereby materially reduces the cutting in of the side walls of the furnace at the slag line which has heretofore been a principal cause of brick repairs. The corrosive action upon the brick walls is further reduced by the fact that the combustion in my improved furnace is rapid and complete instead of progressive throughout the length of the furnace, thereby causing an improved gas condition within the furnace which diminishes the deteriorative effects upon the brick work and reduces the chemical activity of the bath slag upon the furnace walls.
Another and important feature of my invention resides in the fact that where the proportions of the several ingredients of a charge are substantially correct, by mixing with the pulverized fuel just sufficient air to support complete combustion, or, in other words providing a neutral flame; by delivering this mixture at low velocity into the furnace so that the combustion is speedy and complete; by directing the burning mixture downwardly against the bath; and by controlling the pressure within the furnace, an extremely high, intense and penetrating heat is produced, which quickly melts the charge without burning out as large a percentage of the silicon and manganese as has heretofore been burnt out with other methods of firing. The result is that the furnace charge may contain a much larger proportion of cheap scrap metal and a correspondingly less amount of expensive pig iron than customary, thereby reducing the cost of the charge while still producing malleable metal of the desired composition.

And it obviously follows as a corollary of the matter of the foregoing paragraph that regulation of the relative proportions of fuel and air admitted through the burners will vary the character of the flame which may thereby be modulated to meet the requirements of the charge. For instance, if the proportions of the carbon and silicon, manganese and sulphur constituents be too high, the proportion of air in relation to the fuel may be increased to produce an oxidizing flame. On the other hand, by decreasing the proportion of air a reducing flame can be secured, while, as above, if the batch is properly proportioned as it should be, a neutral flame is used which will neither reduce nor increase the relative proportions of the charge ingredients.

Still another object of the invention is the provision of means whereby the direction of discharge of the fuel mixture into the furnace may be regulated and controlled so that it may be directed downwardly upon the masonry floor in front of the bridge wall, or may be directed over the bridge wall into the forward end of the bath, or may be directed toward a point in the bath more remote from its front end, as desired, thus providing for flexibility in the furnace operation so that it may be accommodated to various requirements and rendered highly efficient under all conditions.
Other objects and many of the inherent advantages of my invention should be readily appreciated as the same becomes better understood by reference to the following description, when considered in connection with the accompanying drawings:

Referring to the drawings:

Fig. 1 is a longitudinal sectional view through a furnace embodying my invention;

Fig. 2 is a transverse sectional view through the line 2—2 of Fig. 1; and

Fig. 3 is an enlarged sectional view through the delivery end of the mixer burner.

Referring now to the drawings more in detail, it will be observed that my improved furnace comprises an elongated chamber uninterrupted from end to end but comprising two portions, namely: the rear portion in which the material to be heated is placed, and which may be considered as a heating chamber, and the forward portion where initial combustion of the fuel begins and is practically completed and which may be considered as a combustion chamber. The furnace chamber as a whole comprises the front wall 5, rear wall 6, and the roof 7, all of which are constructed of fire brick in a well known or preferred manner and bound together by suitable tie rods 8 cooperating with buck stays 9.

The bottom of the chamber is provided with a bridge wall 11 extending upwardly into the chamber a limited distance, this bridge wall being spaced a limited distance from the front wall 5 and the space between these walls being filled in and provided with a masonry floor 12 which is inclined downwardly from its front edge to the top of the bridge wall. The foundation 13 of the furnace disposed rearwardly of this bridge wall may be of suitable construction suitably covered in annealing or other heating furnaces, but for melting furnaces, such as I have herein illustrated, this foundation is covered by a sand bed 14 forming the hearth which is substantially level from end to end instead of having a deep depression between its ends, as has heretofore been customary. This bed is adapted to accommodate a bath 15 of molten metal which is relatively shallow and of substantially equal depth from end to end, although in practice the rear portion is slightly sloped from rear to front for a considerable distance to facilitate flow of metal to the tap openings and to decrease the depth of the bath toward the rear of the furnace where the heat is less high. This substantially level hearth permits a substantially even distribution of the solid charge over the area of the hearth and consequently the melting flame, instead of encountering a deep barrier to the bottom of which it would be unable to penetrate, is caused to impinge against a large area and to penetrate the charge of loosely piled solid material and swirl along the bottom of the charge so as to most effectively deliver its heat units to the charge and reduce the melting time to a minimum. In practice the material will be piled somewhat higher at the front end of the pile than it is in the rear of the chamber so that a larger quantity will be subjected to the maximum heat near the forward end of the hearth. The decrease in depth of the bath toward the rear end corresponds approximately to the decrease in temperature and pressure of the products of combustion as they approach the rear end of the chamber. Because of the reduced scale of the drawings, this decrease of bath depth is scarcely apparent in Fig. 1.

For the purpose of holding the hot products of combustion down against the bath, the roof 7 is inclined downwardly toward its rear end, and furthermore, the outlet opening from the furnace to the stack and also the top of the rear bridge wall are disposed only slightly above the level of the bath. The entire structure therefore, is conducive to the most complete transference of heat from the products of combustion to the bath and to a high degree of furnace efficiency.

In order to facilitate the withdrawal of the molten metal from the bath, the floor 14 thereof is preferably slightly convex in transverse cross section, as will be apparent from Fig. 2. This upward arching of the floor is adapted to cause the metal to flow to the sides of the bath from which it may be drawn off through one or more tap holes 16 located at each side of the furnace. Should it be preferable to draw the entire charge from one side of the furnace, the bath floor, instead of being transversely arched, may be slightly inclined from one side to the other so as to deliver the molten metal to one side of the furnace.

The furnace may be charged through doors or openings formed in the side wall or through the roof, which may be equipped with removable bungs, as is customary in reverberatory furnaces. In this instance, I have shown for purposes of illustration, the side wall provided with a plurality of charging doors 18, such as are customarily employed in open hearth furnaces and through which the pig and scrap iron and other ingredients of the charge may be introduced into the chamber and distributed over the hearth.

It will be observed from Fig. 1 that the level of the bath is below the top of the masonry floor 12 and the upper edge of the bridge wall, so that any slag which is deposited on this floor above the level of the bath will drain freely into the bath. Adjacent the front wall 5 the floor 12 is provided with a pocket 19 disposed immediately beneath the delivery openings 21 through which the ground coal mixed with air is delivered into the furnace. The mixture being delivered at low velocity, the ignition begins immediately upon its entrance into the furnace, and since a large proportion of the slag formed, and particularly that portion which is most injurious to the brick work of the furnace is produced at the point of flame formation, it will be apparent that this slag will drop directly into the pocket 19 where it is collected and precluded from entering the bath. I have found that the separation of the slag produced at the point of flame formation of the fuel mixture, and the elimination of this portion from the bath coupled with the speedy and complete combustion of the fuel which improves the gas condition in the furnace changes the chemical character of the bath slag as well as reduces its quantity, with the result that the corrosion of the brick work at the slag line is materially reduced, thereby diminishing the necessity for repairs to the furnace. The slag collected in the pocket 19 may be cleaned out at intervals through cleaning doors 22 located in the side walls of the furnace at each end of the pocket.

I have shown in the present installation somewhat diagrammatically, a preferred type of burner mixer, the general construction of which is disclosed in U. S. Patent No. 1,355,444, granted October 12, 1920, and the preferred specific construction in my co-pending application, Serial No. 299,833, filed May 26, 1919, now Patent No. 1,474,613. In this type of burner, the powdered coal is delivered from a hopper 23 through a worm screw casing into a mixing cylinder 25 to which air under pressure is delivered through a supply pipe 26. The fuel under pressure mixed with air is then conducted through a connection 27 to the mixer proper 28 to which additional air under pressure is supplied through a pipe 29. After being thoroughly mixed with air in this mixer, the fuel is delivered through a tapered downwardly inclined conduit 31 into the forward end of the furnace chamber. The shape of this conduit causes the mixture of fuel and air to be delivered in a turbulent, swirling condition and since the mixer is of the low velocity type, this turbulent supply of fuel continues after ignition in a swirling mass through the furnace in a condition which is most favorable to the transference of its heat to the charge in the furnace.

It will be noted that the delivery of the combustible mixture is in a downwardly oblique direction, but the vertical direction of discharge may be varied and controlled by means of a controlling plate or damper 32 located in the nozzle 33 of the burner. This controlling plate, which may be made of sheet iron or suitable material, is pivotally supported upon a transverse bearing rod 34 which may be equipped at one end with a handle 35 or other means by which the position of the plate may be adjusted to any point intermediate the full open position shown in full lines in Fig. 3 and the full closed position shown in dotted lines in said figure. Any intermediate position between the two positions shown will vary the direction of discharge of the combustible mixture so that it may be diverted downwardly upon the floor 12 or over the edge of the bridge wall into the bath or into the bath at a point more remote from the bridge wall depending on the position of the plate which is, of course, adjusted to meet the requirements of the charge and the condition under which the furnace is being used. For purposes of holding the plate in any adjusted position, I have provided a sector member 36 having provisions for cooperatively engaging the handle 35 to hold it in any adjusted position.

While one or a series of burners for supplying fuel to the furnace may be employed, depending on the size of the furnace and the size of the burners, I have shown in the present instance, as will be apparent from Fig. 2, two burners having their delivery nozzles 33 located in spaced relation in the front wall 5.

The manipulation of the plate 32 will in most instances be sufficient to cause the delivery of the fuel at the requisite point in the bath, and the sloping top wall 7, together with the location and size of the outlet opening and the proper proportion of the stack and proper regulation of the fuel pressure causes the flame to hug the bath closely throughout its length to most effectively heat the bath. In some instances, however, it may be preferable to employ a top blast to augment the downward delivery of the flame and I have therefore made provision in my improvement for the employment of such a blast when required. With this end in view, the top wall of the chamber may be depressed, as indicated at 37, directly above or just rearwardly of the bridge wall 11 and this depressed portion is equipped with a plurality of downwardly directed blast nozzles 37 through which air under pressure is delivered from the transversely extending supply pipe 38. As previously stated, the top blast may be used if desired, but I have found that with my method, the flame is sufficiently controlled and depressed and a high degree of efficiency is obtained without the employment of this blast, which has heretofore been considered indispensable.

The rear end of the furnace chamber is connected with a properly constructed stack 39 through which the products of combustion are discharged and communication is established between the chamber and this stack preferably immediately above the rear bridge wall 41 through an opening 42 which is proportioned according to size of the furnace and the pressure under which the fuel is delivered by the burner nozzles.

It has heretofore been the practice to employ a large communicating opening between the furnace chamber and the stack and to induce strong draft through this opening. The result has been that an enormous quantity of the heat units of the combustible fuel has been carried from the furnace and delivered to the stack so as to be lost for effective use. By employing a low pressure at the fuel delivery nozzles, the velocity of the flame through the furnace is reduced so that its heat units may be transferred to the charge. This desirable effect is further increased by proportioning the connecting opening 44 to the stack and proportioning the stack itself so that a static pressure is normally maintained in the furnace chamber. This pressure as distinguished from a partial vacuum which has heretofore been maintained in these furnaces, greatly facilitates the transference of the heat units from the burning mixture to the charge and insures a practically complete combustion of the fuel particles before they leave the chamber, with the result that few, if any, unburned fuel particles are wasted through the stack. Obviously, this feature greatly enhances the efficiency of the furnace. By regulation of the feed pressure, this static pressure may be controlled and may be reduced to a balanced draft or even to an appreciable up draft if desired.

It will be obvious from the foregoing that in my improved method, the pulverized fuel thoroughly mixed with sufficient air to support complete combustion, is delivered in a turbulent, swirling condition into the furnace in an obliquely downward direction and at low velocity so that ignition and combustion take place close to the delivery nozzle. The combustion being speedy results in an intensive heat quickly liberating the gases so that they do not long remain in a nascent condition in which they would readily combine with the bath slag and increase its corrosive effect upon the furnace walls. Furthermore, a considerable proportion of the slag resulting from flame formation is immediately deposited in the front pocket beneath the burner so that it does not mingle with the bath slag, and consequently, not only the quantity of bath slag is reduced, but the character of the slag is materially improved. The flame directed against the bath being in a turbulent and swirling condition tends, by reason of its point and direction of delivery into the bath, and by reason of the flat character of the bath floor, to penetrate the charge of loosely piled solid material upon the hearth and to travel along the hearth beneath the charge so as to expedite the melting of the same. When the charge is melted, the flame impinges upon its surface and because of the fact that the bath is shallow, and of substantially uniform depth, it becomes quickly and uniformly heated and reduced to a condition suitable for pouring without prolonged operation of the furnace, as is required where the bath floor is deeply depressed so that the molten metal accumulates in a deep pool. The rapidity of the heating in the furnace is further augmented by the fact that the flame is caused to closely hug the bath throughout its length. This condition is produced not only by the direction, velocity and manner of the fuel delivery into the furnace, but also by the fact that the rear portion of the furnace chamber in which the products of combustion are coolest is of progressively reduced cross sectional area by reason of the downwardly sloping roof, and furthermore by the fact that the rear bridge wall is low and the communicating opening with the stack is also low and is so proportioned as is also the stack, that by regulation of the fuel pressure, a slight static pressure may be maintained in the furnace, which is conducive toward complete combustion and the most effective transference of heat to the charge. My method contemplates the delivery with the pulverized fuel itself of sufficient air to support complete combustion. Consequently, an auxiliary supply of combustion air through the walls of the furnace is unnecessary, and in fact, the delivery of auxiliary cold air into the furnace is not desirable since it tends to reduce the temperature thereof. The top blast may therefore be and preferably is entirely eliminated, but since some types of work seem to be slightly more effectively performed by additionally depressing the flame through the instrumentality of a top blast, I have illustrated the application of a top blast to the furnace herein shown.

By the practice of the method above disclosed, I am not only able to reduce the fuel consumption and to expedite the melting, heating and pouring of the charge, but also to employ in the composition of the charge a considerably greater proportion of scrap iron than has heretofore been possible in the production of metal of a predetermined character and composition. This feature is manifestly of significant importance since the proportion of pig iron required may be diminished, thereby decreasing the cost of the furnace charge. In practice, I have found that with my novel method, I am able to utilize, instead of over 60% expensive pig iron, high in silicon and manganese to 40% of scrap which is low in silicon and manganese, as has heretofore been customary, considerably more scrap than pig iron in a charge, and still obtain a resultant malleable iron of superior quality containing the requisite predetermined proportions of silicon, manganese, carbon and sulphur manganese.

Should a test of the molten metal show it to be too low in one ingredient, the flame may be regulated to hold the molten mass in status quo with respect to the other ingredients while the requisite quantity of the low ingredient is added to the charge to produce the desired analysis. My invention therefore, affords a wide range of flexibility in its operation and the results which may be secured thereby.

Furthermore, by reason of the elimination from the bath of a portion of the slag and by improving the character of the bath slag, as the result of improved gas conditions in the furnace, the deterioration of the brick work of the furnace is materially decreased, and the cost of repairs is proportionately diminished, as well as rendering the furnace serviceable for prolonged periods of time.

It is believed that my invention, and many of its inherent advantages, will be understood and appreciated from the foregoing without further description, and while I have shown and described a preferred method and means for carrying it into effect, obviously, both the method and apparatus may be varied within considerable limits without departing from the scope of the invention as defined in the following claims.

I claim:

1. In a furnace, the combination of a heating chamber provided with a hearth, said hearth being substantially level from end to end, arched slightly upwardly in cross section and adapted to contain a shallow bath, and means for delivering a combustible mixture of comminuted fuel and air to said chamber.

2. In a furnace, the combination of a heating chamber, comprising a hearth substantially level from end to end providing a relatively shallow bath, an outlet stack communicating with said chamber, and a rear bridge wall between said bath and said stack, the communicating opening between said chamber and stack being so proportioned with relation to the stack and the feed pressure as to maintain a static pressure in said chamber.

3. In a furnace, the combination of a heating chamber, comprising a hearth providing a shallow bath, an outlet stack, and a rear wall between said chamber and stack provided with a restricted opening adapted to maintain a static pressure in said chamber.

4. A furnace, comprising a chamber having front and rear walls, a hearth, a bridge wall spaced from said front wall, a floor inclined upwardly from said bridge wall toward said front wall and provided adjacent the front wall with a pocket, and means for delivering a mixture of air and comminuted fuel to said chamber directly over said pocket.

5. In a furnace, the combination with a chamber provided with a hearth and a floor sloping upwardly and forwardly of said hearth, of means for delivering to said chamber at low velocity a mixture of comminuted fuel and air in a turbulent condition, and a pocket in said floor immediately beneath the point of entrance of the mixture into the chamber adapted to receive the slag produced at the point of flame formation in said mixture.

6. In a furnace, the combination of a chamber comprising front and rear walls, a hearth, means for maintaining a static pressure in the chamber, means for supplying to said chamber in turbulent condition a mixture of comminuted fuel and air, means for varying the direction of discharge of said mixture into said chamber, and a slag pocket disposed adjacent to and beneath the point of entrance of said mixture into the chamber.

7. The herein described method, which consists in delivering to a furnace containing a charge of material to be treated, a supply of pulverized fuel thoroughly mixed with sufficient air to support complete combustion, causing the delivery of such fuel in a turbulent condition and in a downwardly inclined direction, separating a portion of the slag resulting from flame formation and collecting the same at a point remote from the bath, causing the flame to hug the bath, and maintaining a static pressure in the heating chamber of the furnace.

8. The herein described method, which consists in delivering in turbulent condition to a chamber containing a charge of material to be treated, a supply of pulverized combustible material at low velocity thoroughly mixed with sufficient air to support combustion, causing the flame from said combustible material to travel in proximity to the bottom of the charge, and regulating the pressure within said chamber.

9. The herein described method which consists in producing a malleable metal of predetermined composition by charging a furnace with pig iron and scrap, the quantity of scrap being in excess of the pig iron, and reducing the charge to malleable iron of a predetermined composition by subjecting the charge to a flame of such quality and intensity as will reduce the charge without losing an appreciable portion of the silicon and manganese contained in the charge.

10. The method which consists in depositing in a furnace a charge of metal consisting of less than 50% pig iron and more than 50% scrap iron and subjecting said charge to the action of a flame of such quality and intensity as will reduce the charge without appreciable loss of silicon and manganese thereby producing a high grade malleable iron.

11. The method of treating metals which consists in subjecting a charge of metal in a furnace to the action of a burning turbulent mixture of pulverized fuel and air delivered at low velocity, and controlling the relative proportions of fuel and air so as to produce a flame which will have the desired effect upon the charge.

12. The method of treating metals, which consists in subjecting a charge of metal in a furnace to the action of a burning turbulent mixture of pulverized fuel and air delivered at low velocity, and controlling the quantity and relative proportions of fuel and air so as to produce a flame which will have the desired effect upon the charge.

13. The method of treating metals, which consists in subjecting a charge of metal in a furnace to the action of a burning turbulent mixture of pulverized fuel and air delivered at low velocity, regulating the relative proportions of fuel and air and maintaining a static pressure in the furnace.

14. The method of treating metals, which consists in subjecting a charge of metal in a furnace to the action of a burning turbulent mixture of pulverized fuel and air, and regulating the static pressure in the furnace.

15. The method of treating metals, which consists in subjecting a charge of metal in a furnace to the action of a burning turbulent mixture of pulverized fuel and air, and regulating the proportions of fuel and air to thereby produce an oxidizing, a reducing or a neutral flame at will.

16. The method of treating metals, which consists in subjecting a charge of metal in a furnace to the action of a burning turbulent mixture of pulverized fuel and air, and regulating the flame to cause the production in the metal when poured of the requisite proportions of carbon, silicon, manganese and sulphur.

17. The method of treating metals, which consists in subjecting a charge of metal in a furnace to the action of a burning turbulent mixture of pulverized fuel and air, and regulating the flame to cause the production of the requisite proportions of the various ingredients in the finished batch.

MILTON W. ARROWOOD.